(12) United States Patent
Rogers et al.

(10) Patent No.: US 7,213,207 B2
(45) Date of Patent: May 1, 2007

(54) SYSTEM AND METHOD FOR ACCESSING REGISTERS OF A HARDWARE DEVICE IN A GRAPHICAL PROGRAM

(75) Inventors: Steve Rogers, Austin, TX (US); Jason King, Austin, TX (US)

(73) Assignee: National Instruments Corporation, Austin, TX (US)

( * ) Notice: Subject to any disclaimer, the term of this patent is extended or adjusted under 35 U.S.C. 154(b) by 688 days.

(21) Appl. No.: 09/742,523

(22) Filed: Dec. 20, 2000

(65) Prior Publication Data

US 2002/0109726 A1 Aug. 15, 2002

(51) Int. Cl.
*G06F 9/00* (2006.01)
*G06F 17/00* (2006.01)
*G06F 3/00* (2006.01)

(52) U.S. Cl. .................. 715/734; 715/770; 715/964; 715/771; 715/772; 715/773; 715/735; 715/712; 715/853

(58) Field of Classification Search ........ 345/770–773, 345/734–739, 712–714, 853–855, 964
See application file for complete search history.

(56) References Cited

U.S. PATENT DOCUMENTS 5,214,753 A * 5/1993 Lee et al. .................. 345/610
5,481,741 A * 1/1996 McKaskle et al. .......... 345/522

(Continued)

OTHER PUBLICATIONS

National Instruments Corporation, "LabVIEW® Instrument I/O VI Reference Manual," Jan. 1996 Edition.

Primary Examiner—Kristine Kincaid
Assistant Examiner—Peng Ke
(74) Attorney, Agent, or Firm—Meyertons Hood Kivlin Kowert & Goetzel, P.C.; Jeffrey C. Hood; Jason L. Burgess

(57) ABSTRACT

A system and method for creating a graphical program which accesses registers of a hardware device. In one embodiment, a register access node or primitive may be included in a graphical program, such that when the graphical program is executed on the computer system, the register access node is operable to access (i.e., either read or write) registers of a hardware device in the computer system. The method may comprise first displaying a register access node in the graphical program in response to user input. For example, the user may select the register access node from a palette and drag and drop the register access node onto a window of the graphical program being created. The user may then configure the register access node to access one or more registers of a selected hardware device, e.g., by using a user interface for performing this configuration. In one embodiment, the computer may store a description of the hardware device, wherein the register access node uses the description of the hardware device to access registers of the hardware device during execution of the graphical program. In one embodiment, configuring the register access node may include displaying a list of registers or a list of fields of registers described in the description of the hardware device and receiving user input to select one or more of the registers from the list of registers. The list may also or instead comprise a list of mnemonic names of registers and/or a list of mnemonic names of fields in the registers. The user may thus configure the register access node to access selected registers described in the description of the hardware device.

44 Claims, 13 Drawing Sheets

U.S. PATENT DOCUMENTS

| | | |
|---|---|---|
| 5,619,702 A | 4/1997 | Ilic |
| 5,704,034 A | 12/1997 | Circello |
| 5,847,953 A * | 12/1998 | Sojoodi et al. ............... 700/83 |
| 6,064,812 A | 5/2000 | Parthasarathy et al. |
| 6,064,816 A | 5/2000 | Parthasarathy et al. |
| 6,102,965 A | 8/2000 | Dye et al. |
| 6,229,538 B1 * | 5/2001 | McIntyre et al. ............ 345/734 |
| 6,366,301 B1 * | 4/2002 | Thomas et al. .............. 345/771 |
| 6,512,528 B1 * | 1/2003 | Yamamoto ................... 345/771 |
| 6,553,431 B1 * | 4/2003 | Yamamoto et al. ............. 710/8 |
| 2003/0140090 A1 * | 7/2003 | Rezvani et al. .............. 709/203 |

* cited by examiner

SYSTEM AND METHOD FOR ACCESSING REGISTERS OF A HARDWARE DEVICE IN A GRAPHICAL PROGRAM

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to graphical programming, and more particularly to a system and method for accessing registers of hardware devices in a graphical program.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. The diagram may have one or more of data flow, control flow and/or execution flow representations. In response to the user constructing a diagram or graphical program using the block diagram editor, data structures may be automatically constructed which characterize an execution procedure which corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for measuring, controlling, or modeling devices, such as instruments, processes or industrial automation hardware, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation and numerical analysis, as well as for any type of general programming.

In creating a graphical program, a user may create a front panel or user interface panel. The front panel may include various user interface elements or front panel objects, such as controls and/or indicators, that represent or display the respective input and output that will be used by the graphical program or VI, and may include other icons which represent devices being controlled. The front panel may be comprised in a single window of user interface elements, or may comprise a plurality of individual windows each having a user interface element, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel objects, e.g., the GUI, may be embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using front panel controls. This input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, machine vision applications, and motion control, among others.

In many applications it is necessary or desirable to access registers of a hardware device. Register-level programming provides a maximum amount of flexibility in creating hardware-related applications and/or defining instrument functionality. Thus, it would be desirable to provide the ability to access registers of a hardware device from a graphical program.

Prior art methods of accessing hardware registers from graphical programs have relied on text-based input/output driver programs, which were custom developed for a specific hardware device and for a specific hardware/software platform. Every time the hardware device changed and/or the hardware/software platform changed, a new input/out driver program had to be developed. Also, prior art methods of accessing hardware registers using text-based programming has several limitations. As discussed above, text-based programs use non-user friendly, cryptic commands or instructions. For example, prior art programming methods often used binary or hexadecimal numbers for register addresses and integers for data value. For example, "WRT 6F496 12345" may represent a command to write an integer data value of 12345 to a register at location specified by a hexadecimal address 6F496. Errors in register addressing and/or in determining data type mismatch were difficult to detect and debug. This often resulted in 'system crashes' at run-time with a resultant loss in productivity.

Therefore, improved methods are desired for enabling a graphical program to access registers of a hardware device.

SUMMARY OF THE INVENTION

One embodiment of the present invention comprises a system and method for creating a graphical program which accesses registers of a hardware device. The system comprises a computer system including a display and a user input device. One or more hardware devices may be coupled to or included in the computer system, wherein each device has one or more registers.

In one embodiment, a register access node or primitive may be included in a graphical program, such that when the graphical program is executed on the computer system, the register access node is operable to access (i.e., either read or write) registers of a hardware device in the computer system. The method may comprise first displaying a register access node in the graphical program in response to user input. For example, the user may select the register access node from a palette and drag and drop the register access node onto a window of the graphical program being created.

The user may then configure the register access node to access one or more registers of a selected hardware device, e.g., by using a user interface for performing this configuration. In one embodiment, the computer may store a description of the hardware device, wherein the register access node uses the description of the hardware device to access registers of the hardware device during execution of the graphical program. In one embodiment, configuring the register access node may include displaying a list of registers or a list of fields of registers described in the description of the hardware device and receiving user input to select one or more of the registers from the list of registers. The list may also or instead comprise a list of mnemonic names of registers and/or a list of mnemonic names of fields in the registers. The user may thus configure the register access node to access selected registers described in the description of the hardware device.

In the above description, a user may include a single register access node in a graphical program in order to access registers of a hardware device. In various other embodiments, two or more nodes may be included in the graphical program in order to perform hardware register access. For example, in creating the graphical program, the user may include a first node in the graphical program. The user may then configure the first node to reference a selected hardware device. For example, the user may select a description from a list of descriptions of available hardware devices in the system. In one embodiment, the first node is a hardware refnum node, which may have a corresponding front panel element. Alternately, the first node may be a hardware open node, which optionally may couple to a hardware refnum node.

The user may then include a register access node in the graphical program in response to user input, wherein the register access node is operable to access the hardware device. The user may then connect the first node to the register access node in response to user input, wherein the first node is operable to provide the description of the hardware device to the register access node. For example, the user may use a wiring tool to "wire up" the first node to the register access node, wherein a wire connecting the two nodes or icons is displayed in the graphical program.

The user may then configure the register access node to access selected registers described in the description of the hardware device. For example, the user may right click to display a list of registers described in the description of the hardware device, and then may select one or more of the registers from the list of registers to be accessed, e.g., either read or written. In one embodiment, the user can select mnemonic names of registers or mnemonic names of fields of registers. Also, the register access node may include one or more input terminals for writing registers of the hardware device or one or more output terminals for reading registers of the hardware device. The user may connect these terminals to other nodes in the graphical program to perform any type of desired functionality.

Once the user has created the graphical program, the method may construct execution instructions in response to the graphical program, wherein the execution instructions are executable to access registers of the hardware device. During execution of the graphical program, the register access node may receive the hardware device description and access registers of the hardware device. Thus one embodiment of the present invention provides an improved system and method for creating a graphical program to access registers of a hardware device.

Another embodiment of the invention comprises a system and method for propagating type information for hardware device nodes in a graphical program. The user may display on a computer screen a first hardware device node. For example, the first hardware device node may be included in a block diagram of a graphical program. A hardware device node may be any of various types of nodes relating to hardware devices and may perform any of various hardware-related functions in the graphical program. Particular examples of hardware device nodes, such as a hardware device refnum node, a hardware open node, and a register access node, are discussed herein, and uses of these nodes to access registers of a hardware device are discussed in detail. It is noted, however, that the type propagation techniques described herein are not limited to an application that accesses hardware registers.

After displaying the first hardware device node, the user may associate the first hardware device node with a hardware device. In one embodiment, this comprises associating the first hardware device node with a hardware device class. For example, a plurality of hardware descriptions may be stored on the system, wherein each hardware description defines a hardware device class. In one embodiment, information for each hardware device class may be comprised in a type library. The user may display a list of hardware device classes, e.g., by displaying a context menu when right-clicking on the first hardware device node, and may choose a hardware device class from the list to associate with the first hardware device node.

A second hardware device node may also be displayed in the graphical program, and the user may connect the first hardware device node to the second hardware device node. For example, the first hardware device node may have an output terminal for providing information specifying a hardware device class with which the first hardware device node is associated. The second hardware device node may have an input terminal for receiving information specifying a hardware device class with which to associate the second hardware device node. Thus, the user may display a wire in the graphical program, wherein the wire connects the output terminal of the first hardware device node to the input terminal of the second hardware device node.

In response to connecting the first hardware device node to the second hardware device node, information may be propagated from the first hardware device node to the second hardware device node, wherein the information specifies the hardware device class with which the first hardware device node is associated. The second hardware device node may then be automatically, i.e., programmatically, associated with the same hardware device class with which the first hardware device node is associated.

The hardware device class with which the second hardware device node is thus associated may define one or more methods and/or properties. For example, in one instance, a property may correspond to a hardware register. The user may configure the second hardware device node with information specifying desired methods of the class with which to associate the second hardware device node and/or desired properties of the class with which to associate the second hardware device node. For example, the user may display a list of the valid methods and/or properties for the class, e.g., by displaying a context menu when right-clicking on the second hardware device node, and may choose the desired methods or properties from the list.

At execution time, an object of the hardware device class may be instantiated, and the second hardware device node may invoke the specified object methods and/or may get or set the specified object properties. For example, if a property corresponds to a hardware register, then getting or setting the property during execution of the graphical program may cause reading a value from or writing a value to, respectively, the hardware register.

A method for performing type checking for a hardware device node in a graphical program is also described, e.g., to ensure that a method or property with which a hardware device node is associated is a valid method or property for the hardware device class with which the hardware device node is associated. If the method or property is not valid, for example, then a runtime error could occur when the graphical program is executed.

According to one embodiment of this method, a first hardware device node may be displayed in the graphical program. The first hardware device node may then be associated with a first hardware device class. For example, as described above, the user may connect a wire to an input terminal of the first hardware device node, wherein the wire originates from the output terminal of another hardware device node and propagates information specifying a hardware device class with which to associate the first hardware device node, and the first hardware device node may be automatically associated with this hardware device class. A method or property of the hardware device class may then be associated with the first hardware device node, similarly as described above.

The user may then desire to change the first hardware device node to have an association with a new hardware device class. For example, the user may disconnect the existing wire from the input terminal of the first hardware device node and may connect a new wire to the input terminal. In response, a type checking method may be performed to determine whether the property or method previously associated with the first hardware device node is valid for the new hardware device class. If the property or method is invalid, then an invalid condition may be indicated. For example, a wire specifying the new hardware device class may be visually indicated as a "broken" wire, or the appearance of the block diagram may be altered in various other ways. Also, execution of the graphical program may be prevented, to avoid a runtime error.

One embodiment of a type checking method to determine whether a property or method is a valid property or method for a given hardware device class is described. This method may operate to determine a list of valid methods and properties for the hardware device class and then determine whether the method or property is included in the list of valid method and properties. For example, as noted above, the hardware device class information may be included in a type library. Thus, the respective type library may be queried or examined to determine the list of valid methods and properties.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation By Reference

U.S. Pat. No. 5,847,953 titled "System and Method for Performing Class Checking of Objects in a Graphical Data Flow Program," issued Dec. 8, 1998, whose inventors were Omid Sojoodi and Steven W. Rogers, and which is assigned to National Instruments Corporation, is hereby incorporated by reference in its entirety as though fully and completely set forth herein.

U.S. Pat. No. 5,905,649 titled "System and Method for Performing Instrumentation Independent Virtual Instrumentation Functions Using Attribute Nodes in a Graphical Data Flow Program," issued May 18, 1999, whose inventors were Omid Sojoodi and Steven W. Rogers, and which is assigned to National Instruments Corporation, is hereby incorporated by reference in its entirety as though fully and completely set forth herein.

Figure 1A:
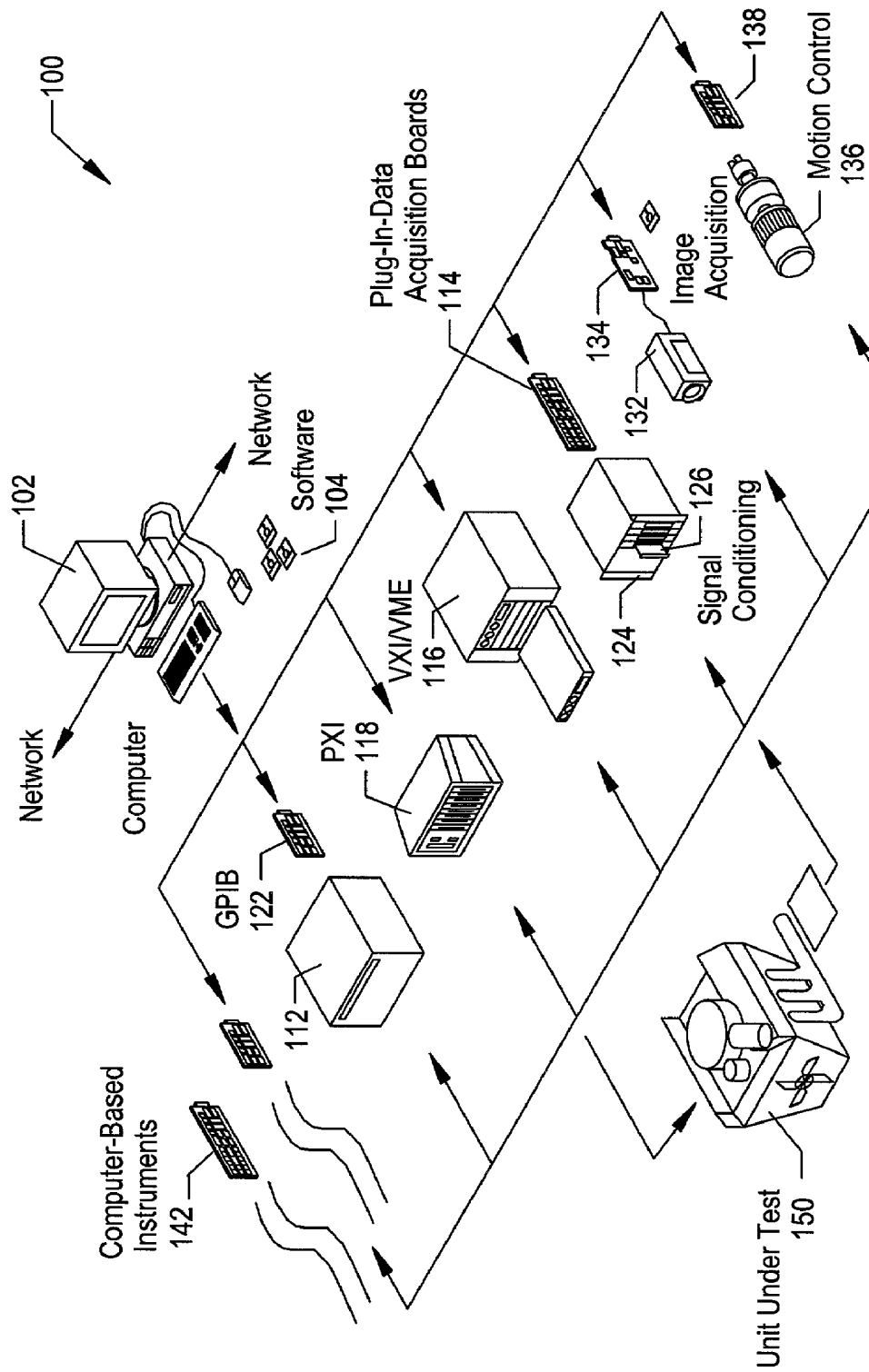
FIGS. 1A and 1B illustrate representative instrumentation and process control systems including various I/O interface options.
Figure 1B:
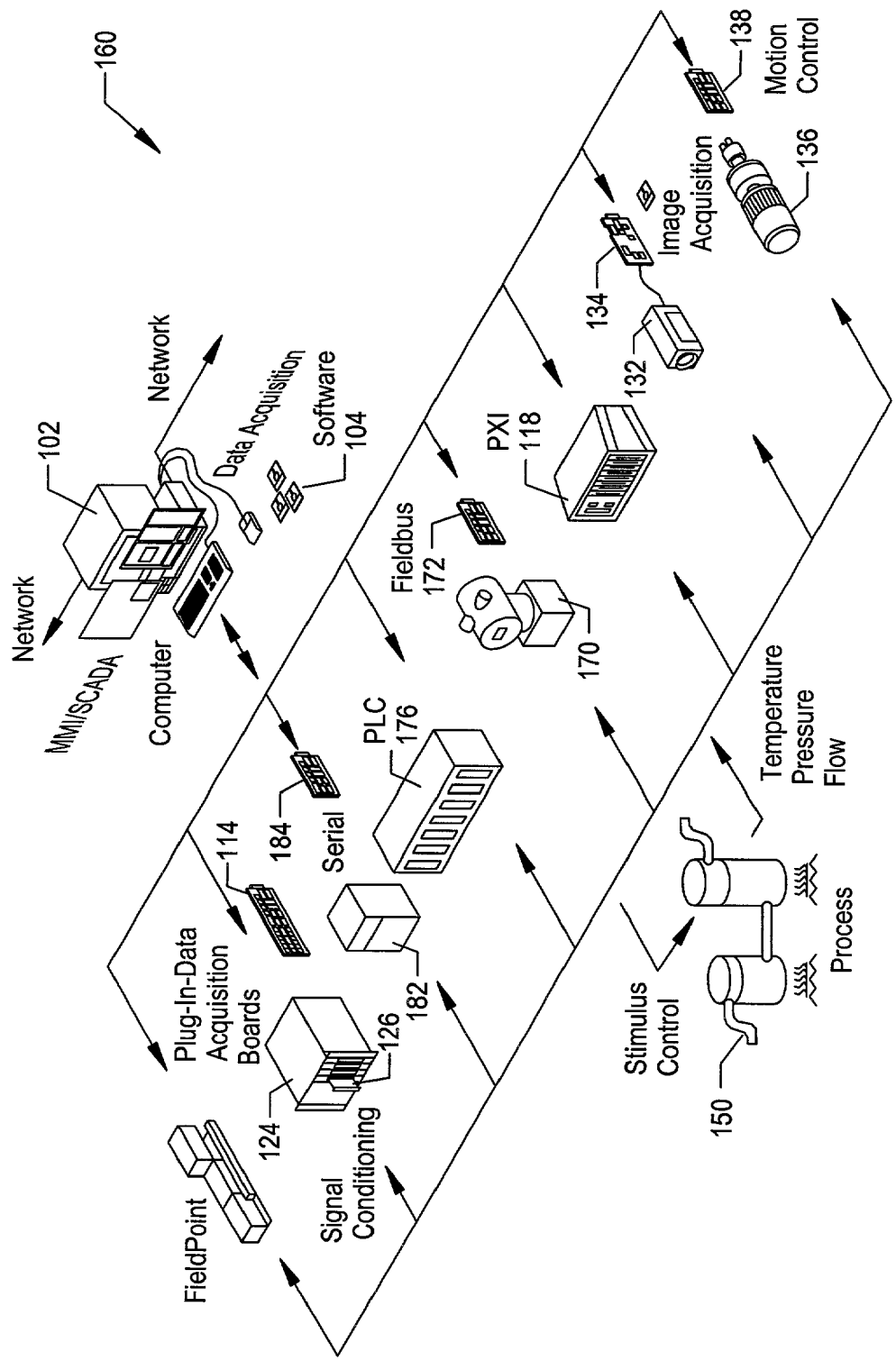

FIGS. 1A and 1B—Instrumentation and Industrial Automation Systems

FIGS. 1A and 1B illustrate exemplary systems which may store or execute a graphical program which accesses registers of a hardware device. For example, the graphical program may perform an instrumentation function, such as a test and measurement function or an industrial automation function. It is noted that graphical programs that access hardware registers may be stored in or used by any of various other types of systems as desired and may implement any function or application as desired. Thus, FIGS. 1A and 1B are exemplary only.

FIG. 1A illustrates an exemplary instrumentation control system 100. The system 100 comprises a host computer 102 which connects to one or more instruments. The host computer 102 may comprise a CPU, a display screen, memory, and one or more input devices such as a mouse or keyboard as shown. The computer 102 connects through the one or more instruments to analyze, measure, or control a unit under test (UUT) or process 150. In one embodiment, the computer 102 may execute a graphical program that accesses registers associated with one or more of the connected instruments.

The one or more instruments may include one or more of a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via the GPIB interface card 122 comprised in the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 may be coupled to the computer 102 via a VXI bus, MXI (e.g., MXI-3) bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument will not be present of each interface type, and in fact many systems may only have one or more instruments of a single interface type, such as only GPIB instruments. The one or more instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 1B illustrates an exemplary industrial automation system 160. The industrial automation system 160 is similar to the instrumentation or test and measurement system 100 shown in FIG. 1A. Elements which are similar or identical to elements in FIG. 1A have the same reference numerals for convenience. The system 160 may comprise a computer 102 which connects to one or more devices or instruments. The computer 102 may comprise a CPU, a display screen, memory, and one or more input devices such as a mouse or keyboard as shown. The computer 102 may connect through the one or more devices to a process or device 150 to perform an automation function, such as MMI (Man Machine Interface), SCADA (Supervisory Control and Data Acquisition), portable or distributed data acquisition, process control, advanced analysis, or other control. In one embodiment, the computer 102 may execute a graphical program that accesses registers associated with one or more of the connected devices or instruments, such as a graphical program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, USB, or IEEE 1394 or 1394.2 provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 1A and 1B, the computer system(s) 102 preferably includes a memory medium(s) on which one or more computer programs or software components according to one embodiment of the present invention are stored. For example, the memory medium may store a graphical programming development environment application which is operable to create graphical programs that access registers of hardware devices. For example, as described below, the graphical programming development environment application may provide one or more nodes related to hardware register access, which users can include in graphical programs in order to access registers of hardware devices. The memory medium may also store a graphical program that includes nodes for accessing hardware registers. The memory medium may also store non-executable data which enables the graphical program to perform the hardware register access, such as a description of the hardware device(s) to be accessed.

The term "memory medium" is intended to include an installation medium, e.g., a CD-ROM, floppy disks 104, or tape device, a computer system memory or random access memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

Figure 2:
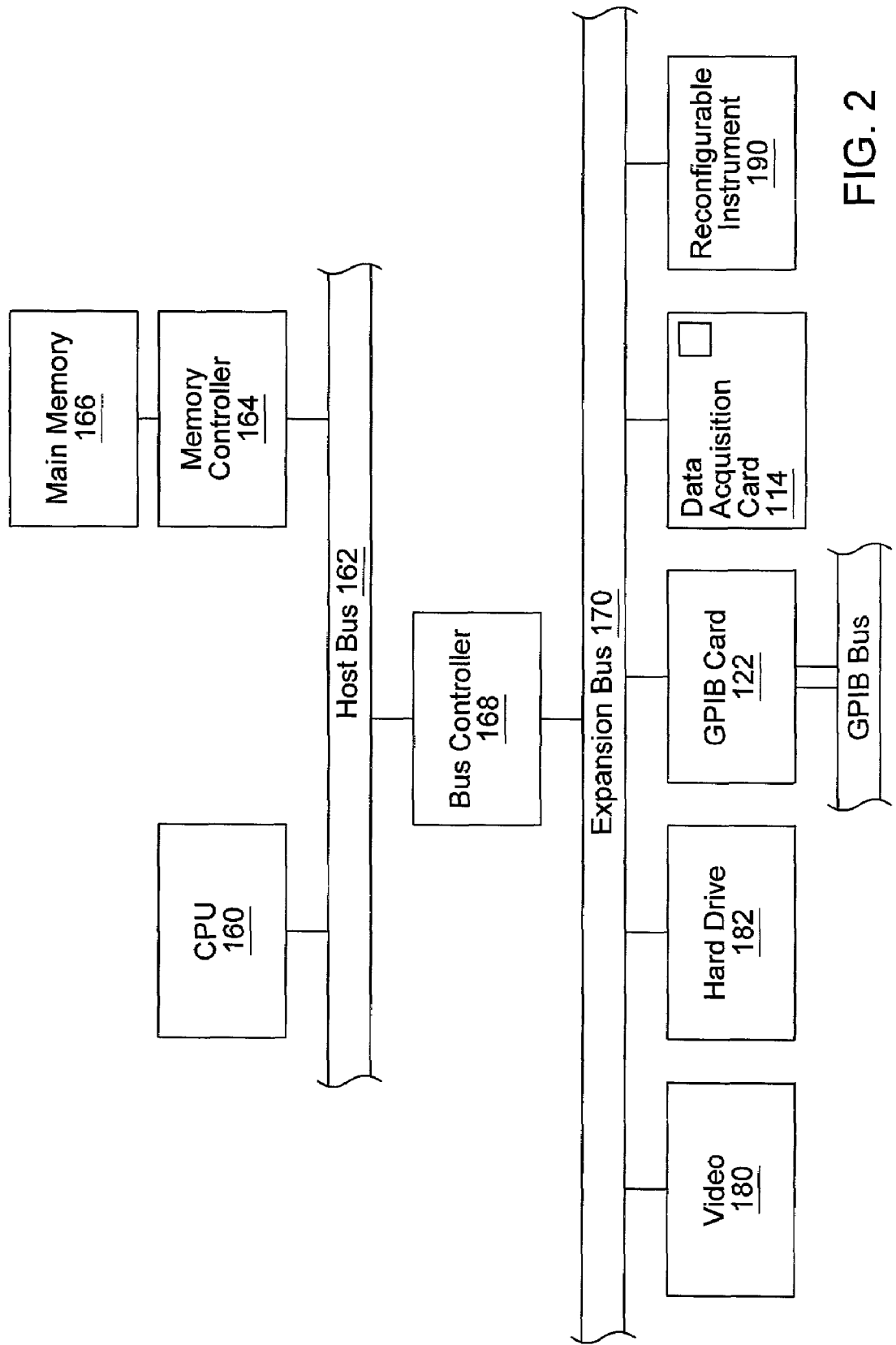
FIG. 2 is a block diagram of the computer system of FIGS. 1A and 1B.

FIG. 2—Computer System Block Diagram

FIG. 2 is a block diagram of the computer system illustrated in FIGS. 1A and 1B. It is noted that any type of computer system configuration or architecture can be used as desired, and FIG. 2 illustrates a representative PC embodiment. It is also noted that the computer system may be a general purpose computer system as shown in FIGS. 1A and 1B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store computer programs according to one embodiment of the present invention. The main memory 166 also stores operating system software as well as the software for operation of the computer system, as well known to those skilled in the art. The computer programs of the present invention will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1A) and a GPIB interface card 122 which provides a GPIB bus interface to the GPIB instrument 112 (of FIG. 1A). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA, or a processor and memory, which may execute a real time operating system. According to one embodiment of the invention, a graphical program that accesses a hardware register may be downloaded and executed on the reconfigurable instrument 190. For example, a graphical programming development system with which the graphical program is associated may provide support for downloading a graphical program for execution on configurable logic in a real time system. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 1A.

Graphical Programming Environment

Figure 3:
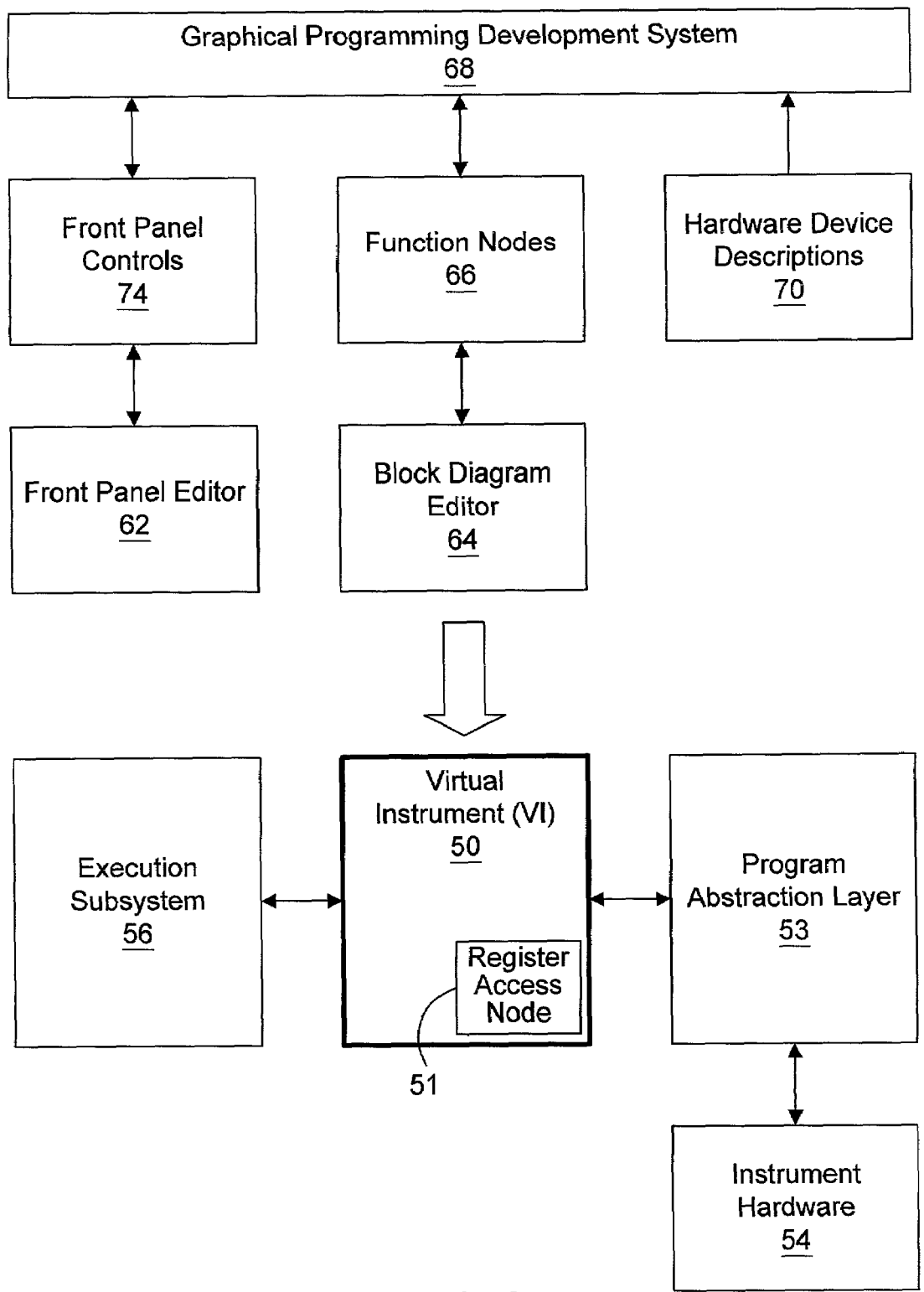
FIG. 3 is a block diagram illustrating one embodiment of a graphical programming development system usable to create graphical programs that access one or more hardware device registers.

FIG. 3 is a block diagram illustrating one embodiment of a graphical programming development system usable to create graphical programs that access one or more hardware device registers. It is noted that the elements of FIG. 3 are exemplary only, and other graphical programming development systems may differ in various ways.

In one embodiment, a programmer employs a front panel editor 62 and a block diagram editor 64 of a graphical programming development system to produce a graphical program. In an instrumentation application, the graphical program may be referred to as a virtual instrument (VI) 50. The VI 50 may include one or more nodes or blocks that may be connected or coupled together as specified by the user. As shown, a register access node 51 may be included in the VI 50, wherein the register access node 51 is operable to access registers of a selected hardware device 54 during execution of the VI 50. The VI 50 may be executed by an execution subsystem 56 of the graphical programming development system to control or access a hardware device 54. The device 54 is illustrative of devices such as those of FIGS. 1A and 1B.

The graphical programming development system may provide various front panel controls or graphical user interface (GUI) elements 74. The front panel editor 62 is operable to generate a front panel or GUI for the VI 50, using one or more of the front panel controls 74.

Figure 4:
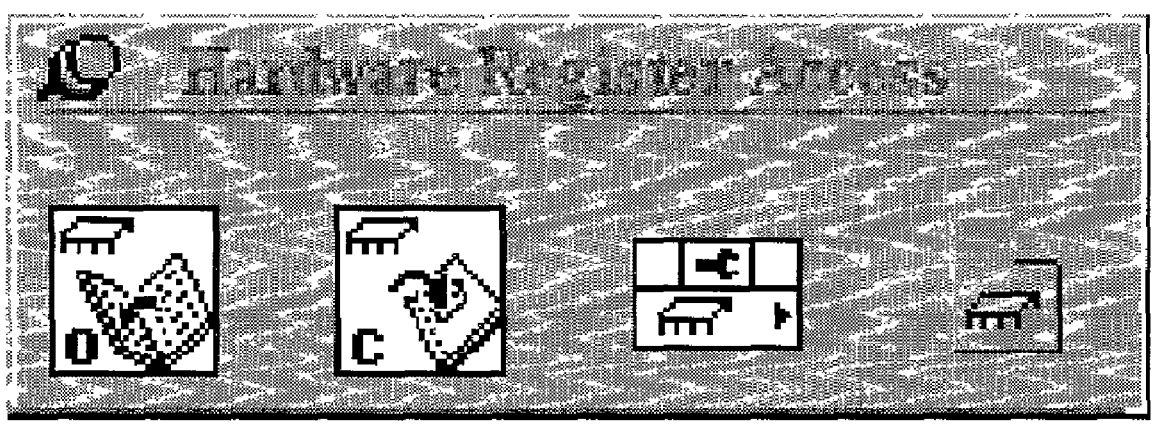
FIG. 4 illustrates a palette including various function nodes related to hardware register access, referred to as hardware device nodes.

The graphical programming development system may also provide various function nodes 66 that may be included, using the block diagram editor 64, in graphical programs to perform various functions. For example, the register access node 51 is one example of a function node. FIG. 4 illustrates a palette including various function nodes related to hardware register access, as provided by one embodiment of a graphical programming development system. In one embodiment, the function nodes 66 comprise a hardware device refnum, a hardware device open node, a hardware device close node and a register access node 51. In another embodiment the open and close nodes are not used. Also, in another embodiment a single register access node may perform the functionality of accessing registers of the hardware device, with no need for a separate hardware device refnum, hardware device open node, or other separate node.

The graphical programming development system may utilize hardware device descriptions 70 to acquire information used in accessing registers of hardware devices. In one embodiment, the hardware device descriptions 70 may include specifications for the hardware device such as register type, mnemonic names of fields of registers, register layout, offset relative to location of hardware, data types, read only or read/write, bit fields, enumerated constants, etc. In another embodiment, the hardware device descriptions 70 may include mnemonic names of registers, types of registers, fields of registers, mnemonic names of fields of registers, number of registers, addresses of registers, number of bits per register, etc.

The execution subsystem 56 may execute executable instructions constructed from a block diagram and/or front panel of the VI 50. For more information about one embodiment of the execution subsystem 56, please refer to U.S. Pat. No. 5,481,741.

When the VI 50 is executed, the register access node 51, included in VI 50, may access or control the device or instrument 54. Stated another way, the register access node 51 is executable to access (read or write) hardware registers in the device or instrument 54. In one embodiment, the register access node 51 may access hardware registers through a program abstraction layer (PAL) 53. The PAL software, which interfaces directly with the hardware device, provides a standard application programming interface (API) for the VI 50. The program abstraction layer 53 includes executable functions, which are called by the VI 50 to perform operations in order to control the instrument 54.

The graphical programming development system of FIG. 3 provides a number of benefits for the development of graphical programs that access hardware device registers. These benefits include gaining a direct read/write access to registers in a hardware device without the need to write specific I/O drivers for the hardware device. This may result in the reduction of the development time required to create the graphical program, as well as reduction of the number of code defects in the graphical program. Another benefit is the simplicity of programming. The simplicity makes the development of a graphical program, such as an instrumentation control program, more practical for a larger number of people, e.g., those who might not have the skills, or resources to develop the skills, to develop programs according to more conventional text-based methods. Also, as discussed below, in one embodiment the graphical programming development system may utilize an object-oriented system design, which allows for class propagation, class checking, and type checking in the graphical programming environment.

Creating a Graphical Program that Accesses a Hardware Register(s)

Figure 5:
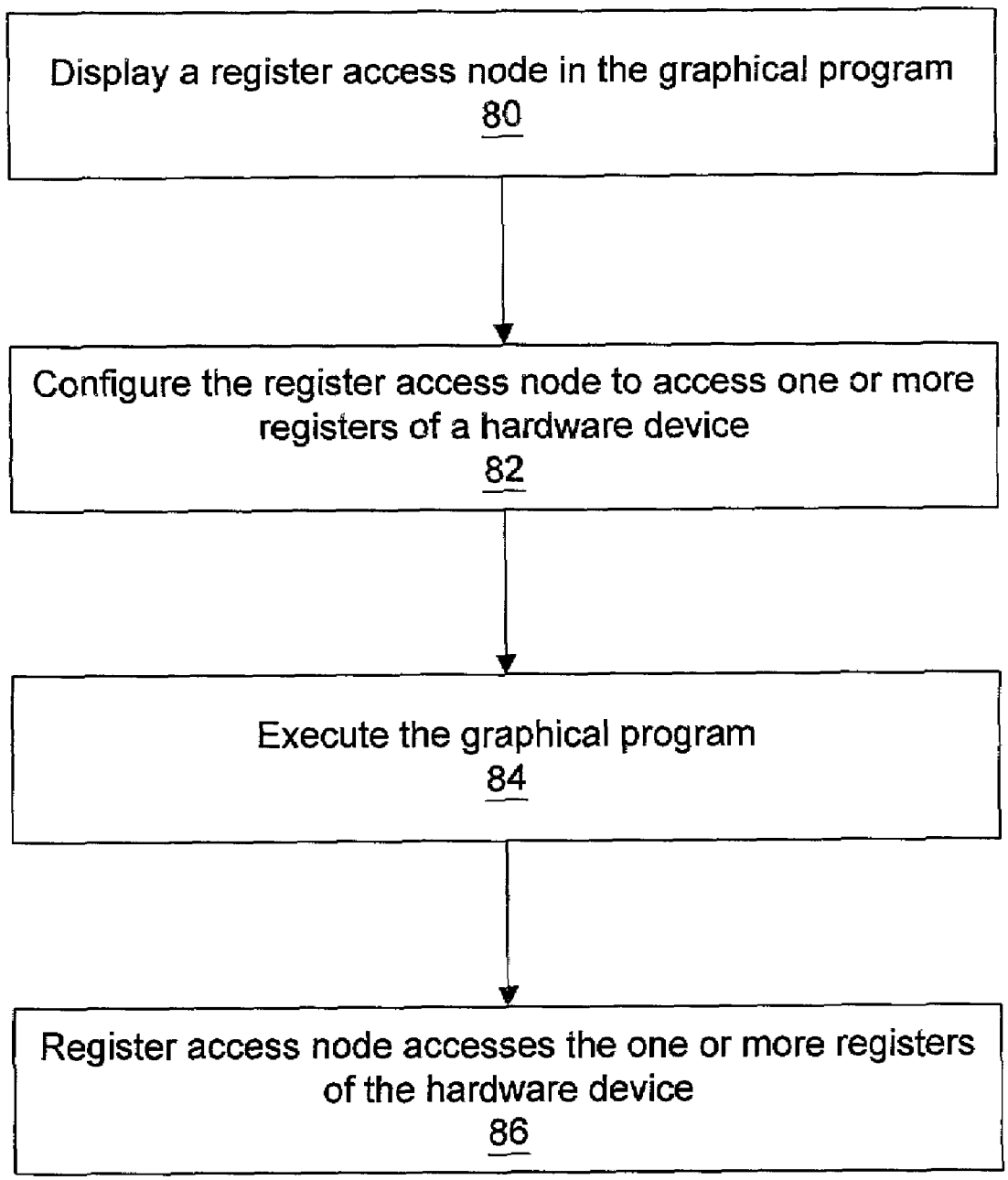
FIG. 5 is a flowchart diagram illustrating one embodiment of a method for creating a graphical program operable to access registers of a hardware device.

FIG. 5 is a flowchart diagram illustrating one embodiment of a method for creating a graphical program operable to access registers of a hardware device.

In step 80, a register access node may be displayed in the graphical program. For example, as described above, a graphical programming development system may provide various nodes for inclusion in the block diagram of a graphical program. Thus, a user may display the register access node in the graphical program's block diagram, e.g., by selecting the register access node from a palette or menu.

In step 82, the register access node may be configured to access one or more registers of a hardware device. In various embodiments, this configuration may be performed in any of various ways. In one embodiment, the graphical programming development system may provide a dialog box or other type of user interface for performing this configuration. For example, the user may select the desired hardware device, select the register(s) of the device to access, specify whether to read from or write to the register(s), etc. In step 82, the register access node may also be connected or wired to other portions of the graphical program. For example, if data is to be written to the register, a data value may be wired from another part of the graphical program into an input terminal of the register access node. If data is to be read from the register, an output terminal of the register access node may be wired into another part of the graphical program. Also, as described below with reference to FIG. 6, in one embodiment, specifying which hardware device and/or which register(s) to access may comprise connecting the register access node to another node, such as a hardware open node.

In step 84, the graphical program may be executed.

In step 86, the register access node may access the one or more registers of the hardware device, as configured in step 82. In other words, including the register access node in the graphical program and configuring the register access node to access the specified hardware device register(s) causes the inclusion of certain executable code in the graphical program, such that when this code is executed during execution of the graphical program, the specified hardware device register(s) is accessed.

Figure 6:
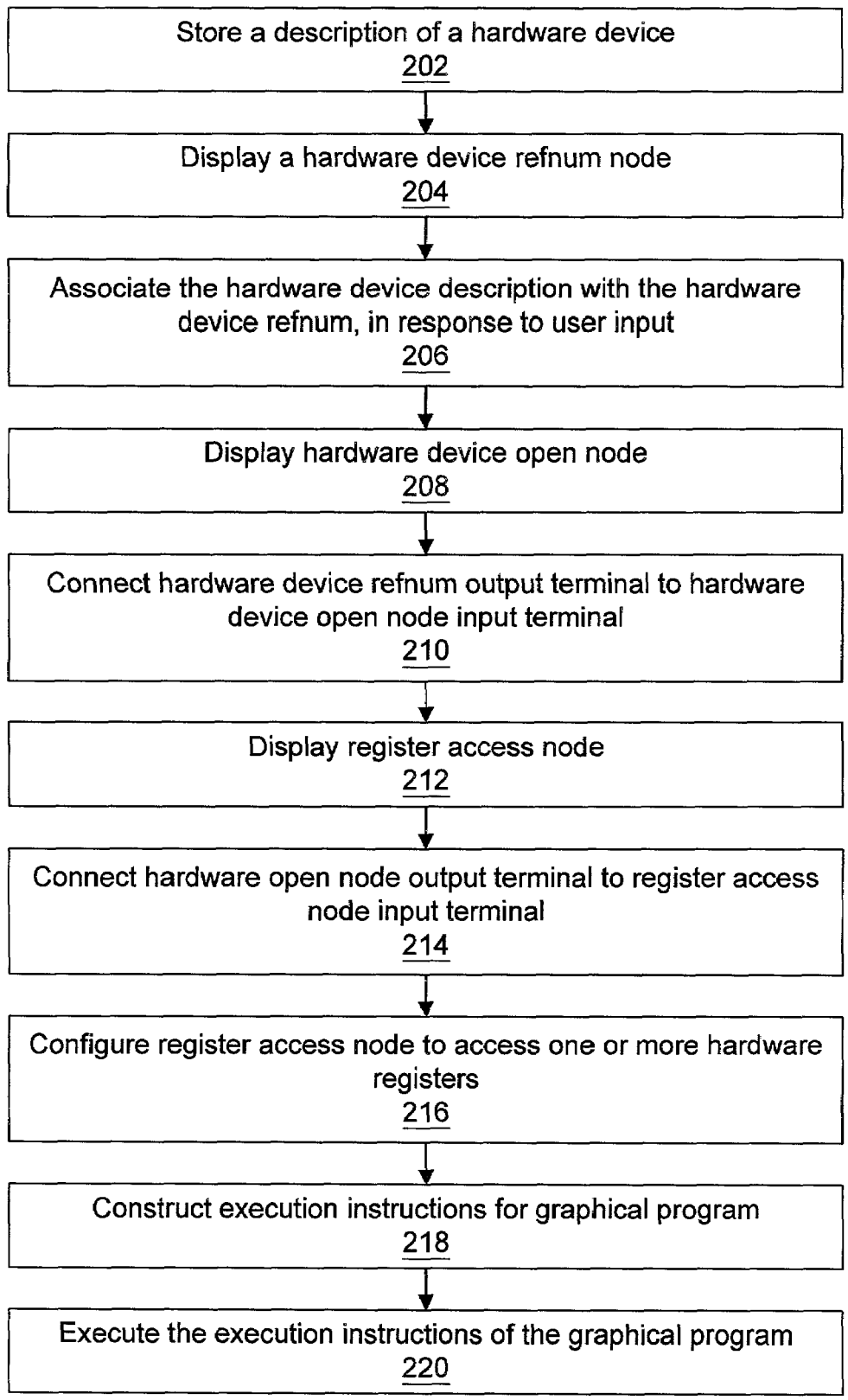
FIG. 6 is a more detailed flowchart illustrating one embodiment of a method for creating a graphical program operable to access registers of a hardware device.

FIG. 6 is a more detailed flowchart illustrating one embodiment of a method for creating a graphical program operable to access registers of a hardware device.

In step 202, one or more hardware device descriptions may be stored. In one embodiment, as described above, hardware device descriptions 70 may include mnemonic names of registers, types of registers, fields of registers, mnemonic names of fields of registers, number of registers, addresses of registers, number of bits per register, etc. In another embodiment, the hardware device descriptions 70 may include specifications for the hardware device such as register type, mnemonic names of fields of registers, register layout, offset relative to location of hardware, data types, read only or read/write, bit fields, enumerated constants, etc.

The hardware device descriptions may be stored in any of various ways and in any desired format. For example, the descriptions may comprise text data, binary data, XML data, or any other type of data. In one embodiment, the descriptions are stored in a type library.

In step 204, a hardware device refnum node may be displayed, e.g., in response to user input. The hardware device refnum node provides, as an output of the node, a reference to a hardware device which is desired to be accessed. In one embodiment, in step 204 the user drops or places a hardware device icon on a front panel, and in response the block diagram editor 64 displays a corresponding hardware device class refnum icon in the block diagram. In another embodiment, the user may drop or place a hardware device refnum node directly in the block diagram of the graphical program.

In step 206 the user may then select a hardware device description to associate with the hardware device refnum node. In one embodiment, the user "right clicks" on the hardware device refnum node, and in response, a list of available hardware device descriptions (e.g., the descriptions stored in step 202) are displayed. The user may then select the desired hardware device description from the list. The hardware device refnum node receives the user input and associates the user-selected hardware device with the hardware device refnum node in step 206. Thus, after step 206, the hardware device refnum node comprises a reference to the selected hardware device description.

In step 208, the user then "drops" or "places" a hardware device open node in the block diagram, In other words, in response to user input the block diagram editor 64 displays a hardware device open node icon in the graphical program in step 208.

In step 210 the user connects the hardware device refnum node and the hardware device open node, e.g., by wiring an output terminal of the hardware device refnum node to an input terminal of the hardware device open node. Thus in step 210 the block diagram editor 64 displays a wire connecting the hardware device refnum and the hardware device open node in step 210 in response to user input. This connection made in step 210 operates, during execution of the graphical program, to provide the selected hardware device description to the hardware device open node. In one embodiment, the hardware device refnum passes class and type library information for the selected hardware device to the hardware open node, and, during execution of the graphical program, the hardware device open node operates to open or instantiate an object based on the hardware device class and type library information.

In step 212 the user "drops" or places a register access node in the block diagram and in response the block diagram editor 64 displays a register access node.

In step 214 the user may connect the hardware device open node and the register access node, e.g., by wiring an output terminal of the hardware device open node to an input terminal of the register access node. Thus in step 214 the block diagram editor 64 displays a wire connecting the hardware device open node and the register access node in response to user input. During execution of the graphical program, the hardware device open node provides information regarding the hardware device being accessed to the register access node.

In step 216 the user may configure the register access node to access one or more registers of the hardware device whose hardware device description is received from the open node. Configuring this access may comprise configuring the node to read from and/or write to the specified register(s). The node may be configured in various ways, depending on the particular embodiment. In one embodiment, the user may "right click" on the register access node to display a list of registers, e.g., registers defined in the hardware description. The user may then select the desired registers. In one embodiment, a pair of input/output terminals for each selected register may appear on the register access node in the block diagram. The user may then connect these input/output terminals as desired to other nodes in the block diagram, e.g., to indicate reading from or writing to the corresponding registers.

As noted above, in one embodiment, the hardware open node instantiates an object representing the hardware device. In this instance, the configuration of step 216 may involve selecting one or more properties of the object and associating these properties with the register access node, e.g., by configuring the register access node to get or set the properties. For example, a property may correspond to a register of the device, e.g., may specify a mnemonic name of a register. The user may select multiple properties, for example as defined in hardware device descriptions 70, to associate with the register access node.

In step 218 the graphical programming environment then constructs execution instructions based on the VI or graphical program comprising the connected hardware device refnum node, the hardware device open node, the register access node, and other function blocks, sub-diagrams, or other elements the user chose to include in the graphical program. The graphical programming environment then executes the execution instructions in step 220. The time during which a user is creating or editing a VI 50 by dropping nodes and wiring them together is referred to as "edit-time." The time when instructions of the VI 50 are executed is referred to as "run-time".

In an alternate embodiment, the user creates the graphical program having a register access node without using a hardware device open node. For example, the user may connect the hardware device refnum node directly to the register access node. In this embodiment, the register access node receives the hardware device description information and performs the function of the hardware open node in addition to its register access functions.

In another alternate embodiment, the user creates the graphical program having a register access node without using either a hardware device open node or a hardware device refnum node. In this embodiment, the user may drop or place the register access node in the block diagram and then may configure the register access node with the desired hardware device to be accessed. For example, the user may "right click" on the register access node and select the hardware device to be accessed from a list of available hardware devices. Once the device has been specified, the desired registers to access may then be chosen.

Figure 7:
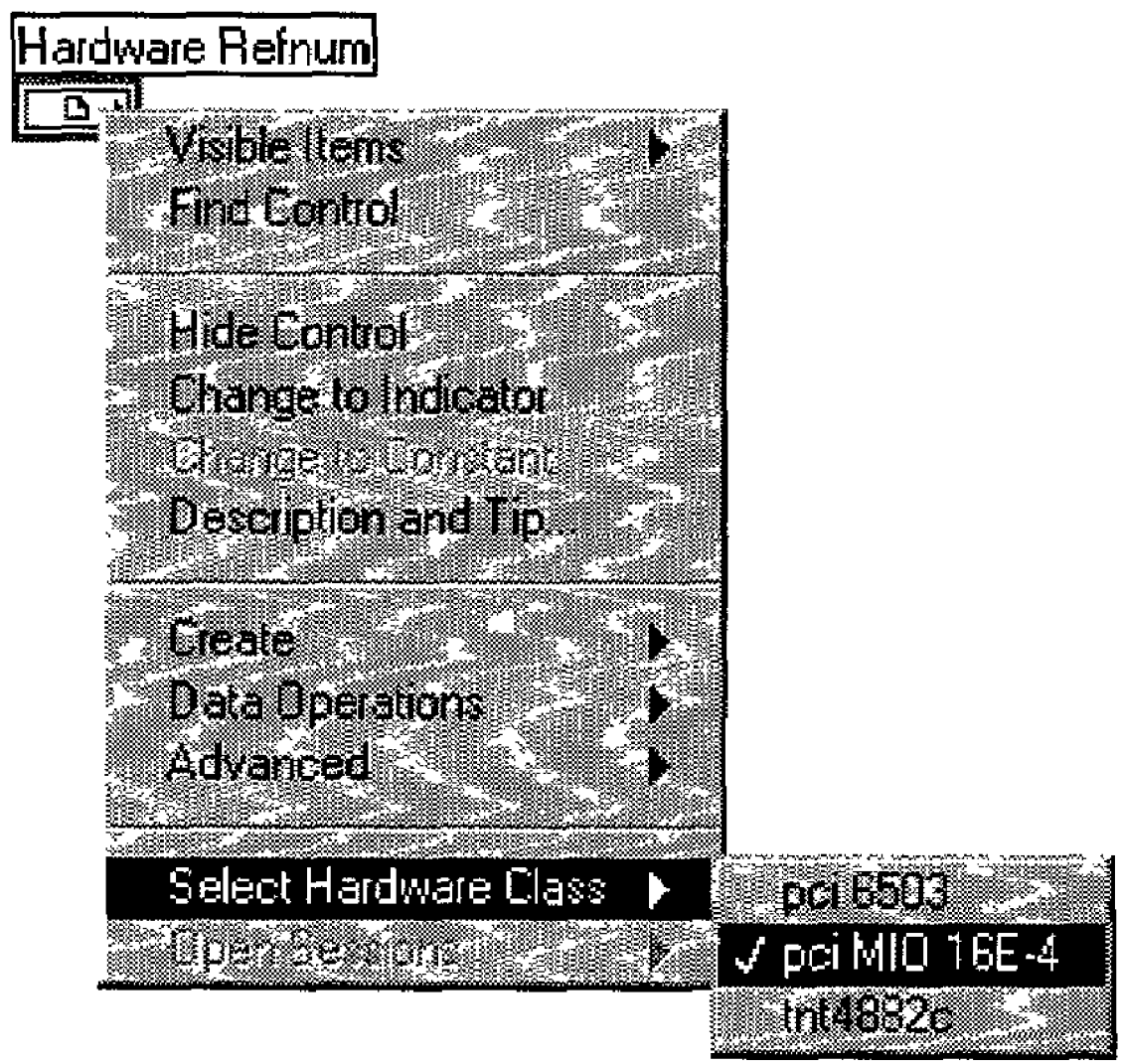
FIG. 7 illustrates a hardware device refnum node displayed in a block diagram and illustrates a pop-up menu for the hardware device refnum node including a "Select Hardware Class" menu item.

As described above, in one embodiment, a hardware device refnum node may be associated with a hardware device class, e.g., a class described in a type library. FIG. 7 shows a hardware device refnum node displayed in a block diagram. FIG. 7 also shows a pop-up menu for the hardware device refnum node including a "Select Hardware Class" menu item. The user may right click, e.g., using a mouse, on the hardware device refnum node in order to see the pop-up menu. For example, in response to the right click, the hardware device refnum node may query an object manager for a list of stored hardware device descriptions 70 associated with the hardware devices present in the system. For example, in one embodiment the object manager may query a registry of the host computer to obtain a list of the hardware device type libraries present in the system, wherein each hardware device type library defines a hardware device class. The hardware device refnum node may then display the list of hardware device classes in the pop-up menu.

The user may then select a hardware device class from the list displayed by the hardware device refnum node. The hardware device refnum node may include a refnum output terminal, to which a wire may be connected. At edit-time, the hardware device refnum node provides, at its output terminal, a type descriptor, which specifies the selected hardware device class, and the type library to which the hardware device class belongs. Type descriptors are described in detail below.

As described above, the user may then include a hardware device open node on the block diagram and connect the hardware device refnum node output to a refnum input terminal of the hardware device open node. (As noted above, in an alternate embodiment, the hardware device open node also serves the function of the hardware device refnum node by receiving the hardware device class information as user input.) As discussed below, the type descriptor received from the hardware device refnum node may be used in performing type propagation checking.

The hardware device open node also includes a refnum output terminal, to which a wire may be connected. At edit-time, the hardware device open node forwards the type descriptor received at its refnum input terminal to its refnum output terminal. The type descriptor is forwarded on a connected wire to all other nodes connected to the wire. (At run-time, the hardware device open node instantiates an object based on the hardware device class and type library information received from the hardware device refnum node, and passes a reference to this object via its refnum output terminal.)

As described above, the user may include a register access node on the block diagram and connect the refnum output terminal of the hardware device open node to a refnum input terminal of the register access node. It is noted that the refnum input terminal of the register access node may instead be connected to other wires which provide the reference to the object and type descriptor rather than receiving the reference from the refnum output terminal of the hardware open node. For example, the refnum input terminal of the register access node may be connected to the refnum output terminal of another hardware device node of the same object class.

At edit-time, the register access node receives a type descriptor via its refnum input terminal so that the register access node may perform type propagation checking. The register access node also uses the information in the type descriptor at edit-time to perform other operations, such as displaying hardware device property lists as described below. (At run-time, the register access node receives a reference to the instantiated object via its refnum input terminal so that the register access node may set or get properties (access registers) of the instantiated object.)

The register access node also includes a refnum output terminal. The register access node passes the information received on its refnum input terminal to its refnum output terminal, i.e., the type descriptor, at edit-time and passes the object reference at run-time.

As described above, the hardware device open node (or other hardware device object node to which the register access node is connected) provides information on the selected hardware device class and selected type library to the register access node. The hardware device class and selected type library information may be provided as a type descriptor which includes the hardware device description information.

Figure 8:
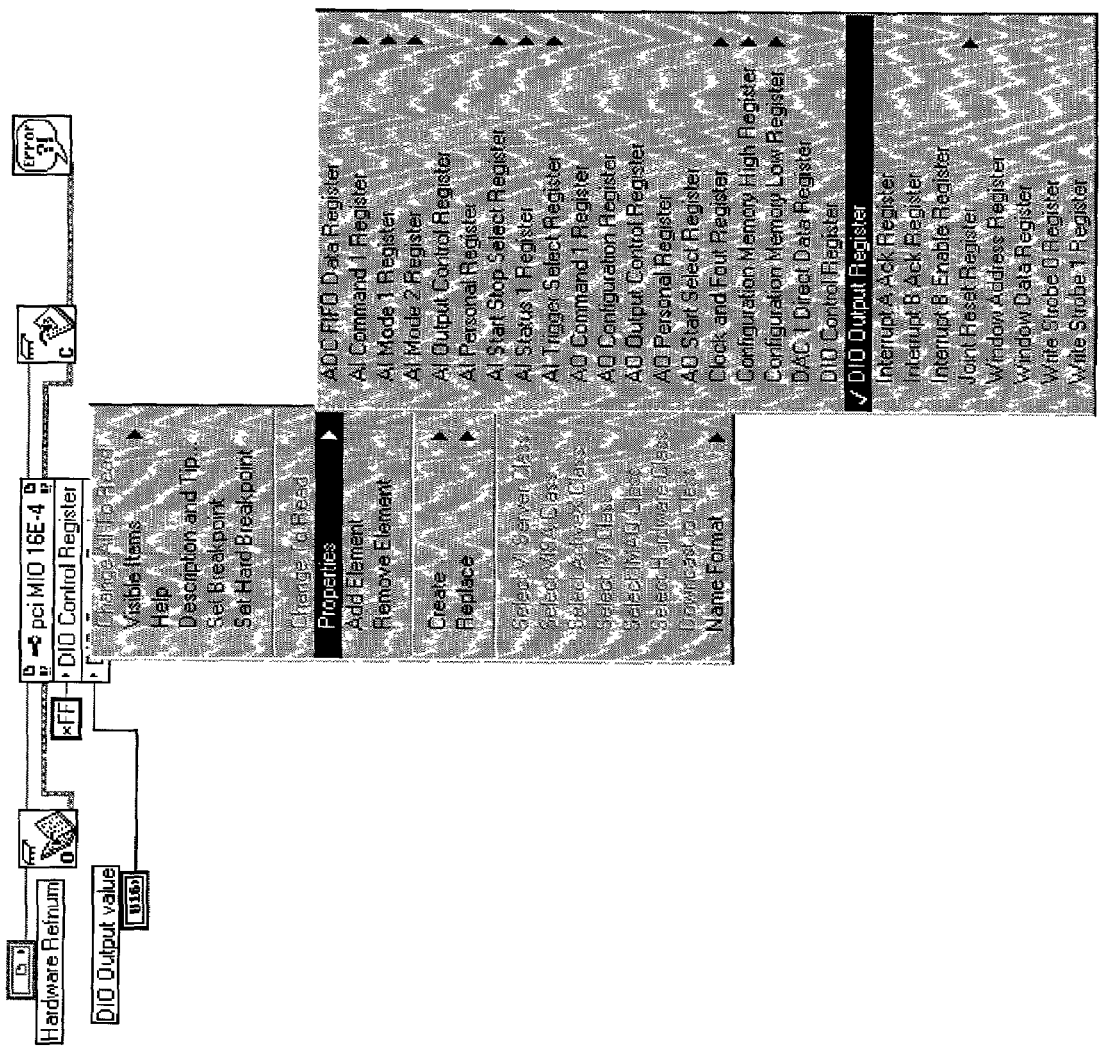
FIG. 8 illustrates a register access node displayed in a block diagram and illustrates a selectable list of properties of a hardware device class which has been associated with the register access node, wherein the properties correspond to hardware registers.

The user may select a "Properties" menu item by right-clicking on the register access node to display a popup menu. In response to selecting this menu item, the register access node may display a list of properties associated with the selected hardware device class. The hardware device class and type library information received from the hardware open node may be used in querying an object manager for this list of properties. In response, the object manager may query the selected type library for a list of properties of the specified hardware device class. The register access node uses the information received from the object manager to display the list of properties of the selected hardware device class, as shown in FIG. 8. The user may then select from the displayed list of properties. For example, as described above, each property may correspond to a register, and the user may select the desired registers to access. In the example of FIG. 8, the user may select desired registers of a PCI MIO 16 E 4 DAQ card device with which the register access node is associated.

Figure 9:
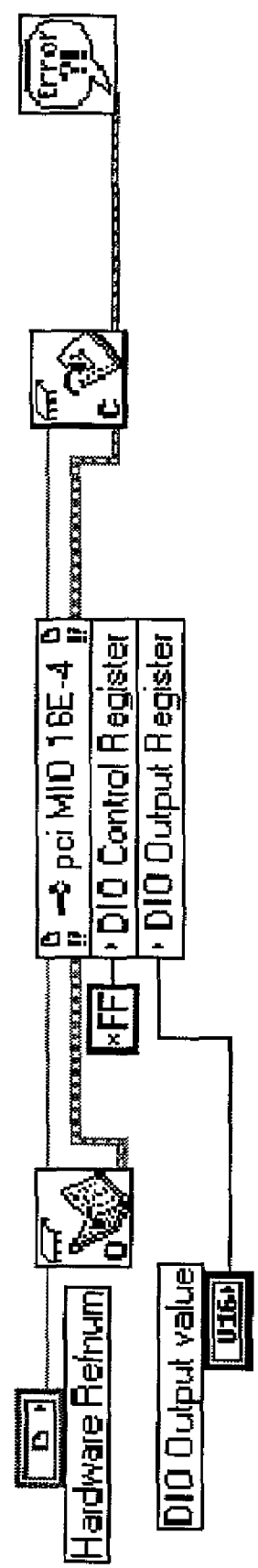
FIG. 9 illustrates a register access node displayed in a block diagram, wherein the register access node has been configured to write data to two registers of a hardware device, and in response a pair of input terminals for properties corresponding to these registers has been displayed on the node.

For each selected property, the register access node may display a terminal for the selected property, as shown in FIG. 9. If the property (register) may be set, i.e., written, the register access node displays an input terminal. If the property (register) may be gotten, i.e., read, the register access node displays an output terminal. Preferably, a property (register) may be set to be readable or writable in response to user input. The user may then connect or wire the input and/or output terminals as desired to other values or nodes in the block diagram. In the example of FIG. 9, the register access node has been configured to write values to two registers of a PCI MIO 16 E 4 device.

Graphical Program Execution

Once the user has created the graphical program, the graphical programming development system may create execution instructions for the graphical program in accordance with the block diagram. Constructing the execution instructions may comprise generating machine language instructions into an executable program. Alternatively, constructing the execution instructions may comprise generating programming language instructions, such as C language instructions, and compiling the programming language instructions into an executable program. Once the execution instructions have been generated, the user may request the graphical programming development system to execute the instructions. In response, the execution subsystem 56 (of FIG. 3) may executes the execution instructions of the graphical program. In one embodiment, the execution instructions are interpreted rather than compiled.

For each hardware device node and other node in the block diagram, corresponding execution instructions may be generated. For the hardware device open node, the corresponding execution instructions may be operable to instantiate an object from the hardware device class indicated by the hardware device refnum node. For the register access node, the execution instructions may be operable to set and/or get the specified properties of the instantiated object, which may cause the corresponding hardware registers to receive the values supplied at corresponding property input terminals and/or cause values from the corresponding hardware registers to be provided to the corresponding property output terminals.

Thus, in one embodiment the method enables a user to access registers of hardware devices by means of a graphical programming development system operable to instantiate objects from hardware device classes and invoke methods and properties of the hardware device objects.

Type Propagation Checking

Type Descriptor

As described above, type propagation checking may be performed at edit-time when wires are connected to input terminals of hardware device nodes. In one embodiment, each wire and terminal in a block diagram may have an associated data type. The programming environment may keep track of the data type in a structure in memory called a type descriptor. For example, the type descriptor may comprise a string of word integers that describe the data type. In one embodiment the generic format of a type descriptor is:

<size> <typecode>.

Table 1 lists three of the supported data types, the type codes, and type descriptors in one embodiment of the programming environment.

TABLE 1

| Data Type | Type Code | Type Descriptor |
|---|---|---|
| Long Integer | 0x03 | 0004 xx03 |
| Handle | 0x31 | 0006 xx31 <kind> |
| Array | 0x40 | <nn> 0x40 <k> <k dimensions> <element type descriptor> |

When a wire is initially connected to a terminal, the wire takes on the data type of the terminal, i.e., the programming environment creates a type descriptor for the wire. When the user connects this wire to another terminal in the block diagram at edit-time, the programming environment performs type propagation checking by comparing the type descriptor of the wire with the type descriptor of the terminal. If the type descriptors do not match, then a type conflict error is generated. In one embodiment, the programming environment performs type propagation checking on each wire and terminal in the block diagram each time a change is made to the diagram. That is, type descriptors are propagated on the wires of the block diagram at edit-time in order to perform type propagation checking.

Thus a type descriptor may be defined for a hardware device refnum terminal and used in type propagation checking. The hardware device refnum terminal type descriptor may include an identifier for the hardware device class associated with the hardware device refnum node and an identifier for the type library for the hardware device class. In one embodiment, the hardware device refnum type descriptor has the format:

<size> <RefnumCode> <HardwareRefnumKind> <HardwareType>

<no of int16's> <kCoClassCLSID> <CLSID of created object>

<kTypeLibCLSID> <CLSID of type library> <DISPID>

The <size> byte of the type descriptor is as described above. The <refnumCode> is the type code for a refnum. The <HardwareRefnumKind> value distinguishes this refnum from other refnums as a hardware device refnum. The <HardwareType> indicates the hardware type, such as the <kStHWDevType> value, which indicates a static hardware device type. The <no of int16's> field indicates the number of 16 bit words which follow. The <kCoClass-CLSID> value indicates the following 128 bits are a class identifier. The <CLSID of created object> is a unique 128 bit number associated with the particular hardware device class which the hardware device refnum references. The <kTypeLibCLSID> value indicates the following 128 bits are a type library identifier. The <CLSID of type library> is a unique 128 bit number associated with the particular type library to which the hardware device class belongs. The <DISPID> is a Dispatch ID, which is a long integer to uniquely specify a class within a type library. The Dispatch ID is associated with the Microsoft IDispatch interface for dispatch methods and properties. The Dispatch ID is unique within a type library.

In one embodiment, the hardware device nodes may be implemented as objects having associated methods, including a type propagation checking method. Thus, the block diagram editor 64 may invoke the type propagation checking method when necessary to perform type propagation checking. For example, when the user connects a wire to a terminal of a hardware device node, the type propagation method of the node may be invoked and the type descriptor of the wire being connected to the terminal may be passed as an argument to the type propagation method. The information in the type descriptor enables the type propagation method to determine class conflicts in the block diagram.

Thus, the method may advantageously perform type propagation checking to determine program correctness when wiring hardware device function nodes. This checking advantageously prevents run-time errors, which would occur if the user attempted to invoke an invalid method or property for the hardware device class selected.

Propagating Type Information

Figure 10:
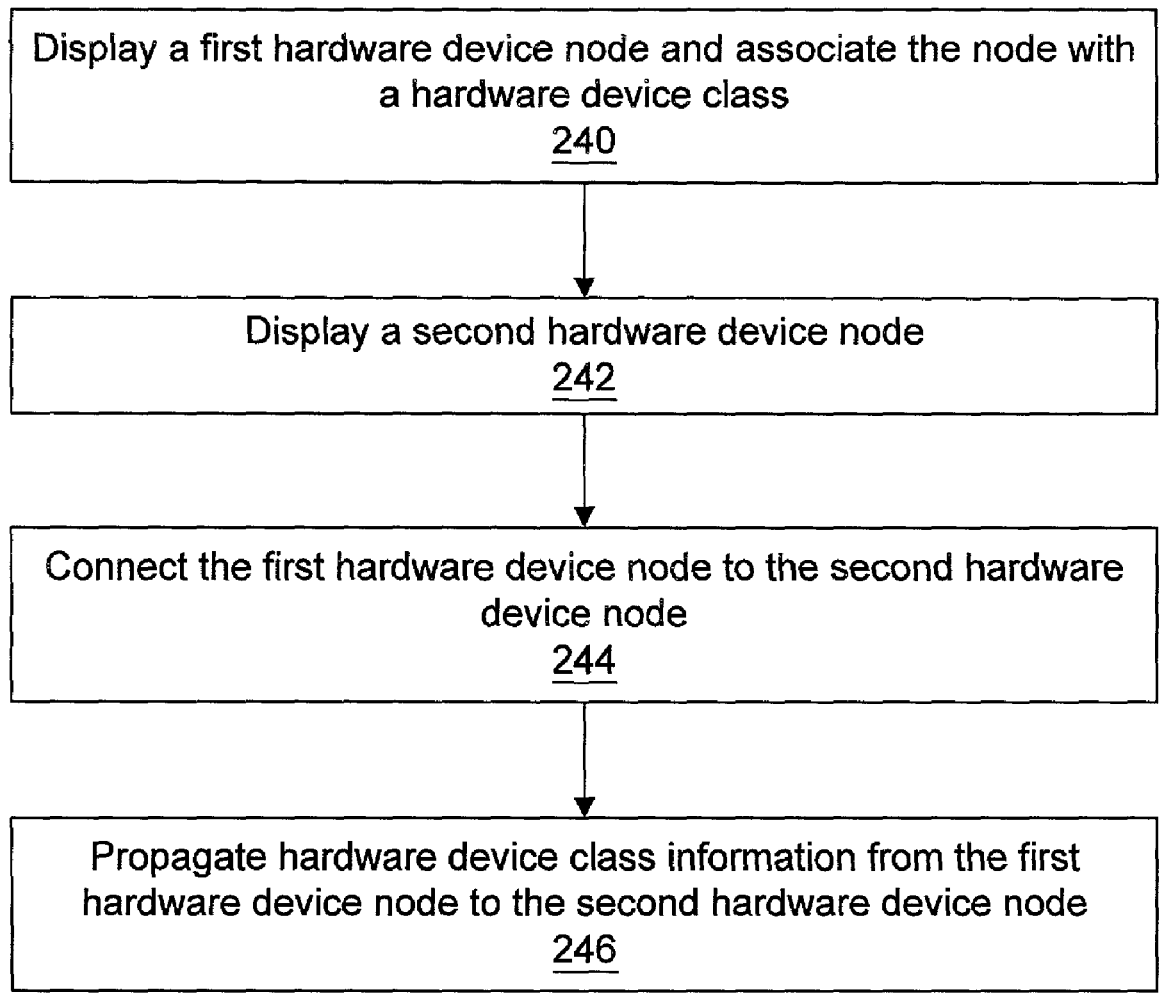
FIG. 10 is a flowchart diagram illustrating one embodiment of a method for propagating type information from a first hardware device node to a second hardware device node.

FIG. 10 is a flowchart diagram illustrating one embodiment of a method for propagating type information from a first hardware device node to a second hardware device node. The hardware device nodes may be any of various types of nodes relating to hardware devices, such as the hardware refnum node, hardware open node, and register access nodes discussed above, or any other type of hardware device node. It is noted that the method of FIG. 10 may be used for performing type propagation checking for a graphical program that performs any of various hardware-related functions, and is not limited to an application which accesses hardware registers.

In step 240, a first hardware device node may be displayed, and the node may be associated with a particular hardware device or hardware device class. For example, the first hardware device node may be a hardware device refnum node such as described above, and the user may display a list of hardware device classes stored in the system and may associate a class from this list with the node.

In step 242, a second hardware device node may be displayed. For example, the second hardware device node may be a hardware open node such as described above.

In step 244, the first hardware device node may be connected to the second hardware device node, wherein this connection serves to associate the second hardware device node with the same hardware device class with which the first hardware device node is associated. For example, as described above, the first hardware device node may have a refnum output terminal that provides information specifying the associated hardware device class. The second hardware device node may have a refnum input terminal which may be connected to this refnum output terminal to receive the hardware device class information. Thus, in the block diagram, a wire from the first hardware device node to the second hardware device node may be displayed.

In step 246, the hardware device class information may be propagated from the first hardware device node to the second hardware device node. That is, the second hardware device node receives the hardware device class information from the first hardware device node. As described above, the information may be comprised in a hardware device refnum type descriptor. The second hardware device node may then be associated with the hardware device class specified by the type descriptor.

In the example given above, the first hardware device node is a hardware device refnum node, and the second hardware device node is a hardware open node, but, as noted, the first and second nodes may be any of various types of hardware device nodes. In the case of the hardware device refnum node, the node has a refnum output terminal that can provide the hardware class information to other nodes but does not have a refnum input terminal that can receive hardware class information from other nodes (since the user initially associates the hardware class with the hardware device refnum node). In other cases, the first hardware device node may have both a refnum output terminal and a refnum input terminal. For example, after connecting a hardware open node's refnum input terminal to a hardware device refnum node's refnum output terminal, the user may then connect a register access node's refnum input terminal to the hardware open node's refnum output terminal. In this instance, the hardware open node may be considered as the first hardware device node, and the register access node may be considered as the second hardware device node. Thus, hardware device class information which the hardware open node initially received from the hardware device refnum node may subsequently be passed to other nodes, thereby propagating the hardware device class information through a chain of hardware device nodes.

Checking Type Information for Hardware Device Nodes

As described above, at edit-time a hardware device node may be associated with a particular hardware device class. At run time, the hardware device node may receive an instantiated object of this class (or may receive a reference to the instantiated object). The hardware device node may be configured to invoke various methods on the object or to get/set various properties of the object. For example, as described above, the hardware device node may be a register access node that is configured to get/set object properties that reference hardware device registers. Thus, it would be desirable to enable the programming environment to perform type propagation checking to ensure that the methods and/or properties configured for the hardware device node are valid methods/properties for the hardware device class with which the hardware device node is associated. The hardware class information propagated as described above with reference to FIG. 10 may be used to perform this check.

Figure 11:
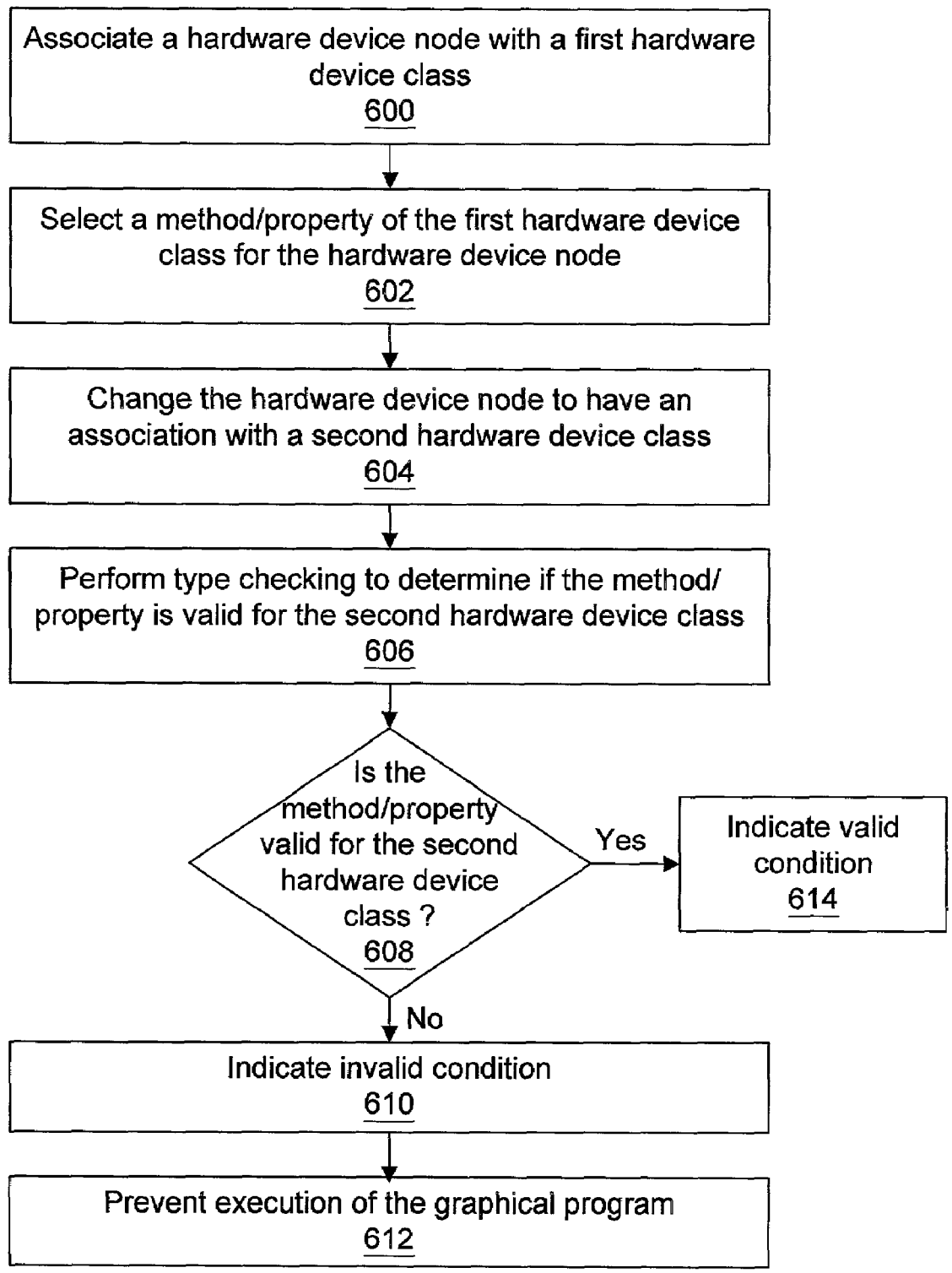
FIG. 11 is a flowchart diagram illustrating one embodiment of a method for performing type checking for hardware device nodes.

FIG. 11 is a flowchart diagram illustrating one embodiment of a method for performing type checking for hardware device nodes. In step 600, a hardware device node may be associated with a first hardware device class. This association may occur in various ways. For example, as described above, the user may connect a wire from a refnum output terminal of another hardware device node to a refnum input terminal of this hardware device node, and hardware device class information from the other node may be propagated to this node, thus associating this node with the same hardware device class.

In step 602, a method or property of the first hardware device class may be selected for the hardware device node, so that when the graphical program is executed the hardware device node is operable to invoke the selected method or get/set the selected property. As described above, the programming environment may be operable to determine a list of valid methods/properties for the first hardware device class, e.g., by querying an object manager.

In step 604, the hardware device node may be changed to have an association with a second hardware device class. For example, the user may disconnect the wire that was originally connected to the hardware device node's refnum input terminal and may connect a new wire to the terminal. For example, the new wire may originate from a different hardware device node that is associated with the second hardware device class, which may be different than the first hardware device class.

In step 606, a type checking method may be performed, to determine whether the method/property that was selected in step 602 is a valid method/property for the second hardware device class. One embodiment of such a method is described below with reference to FIG. 12.

In step 608, the result of the type checking method is checked. If it was determined that the method/property is valid, then in step 614 a valid condition may be indicated, e.g., the graphical program may appear "normal" and the programming environment may not indicate an error.

If the method/property was determined to be invalid, then in step 610 an invalid condition may be indicated. For example, the programming environment may visually or otherwise indicate a type error, e.g., by displaying a "broken" wire to the refnum input terminal of the hardware device node, or changing the color of the wire, etc., or may indicate the problem in any of various other ways, e.g., by changing a color of text in the node, wherein the text indicates the currently selected method/property. Also, as shown in step 612, the programming environment may prevent execution of the graphical program until the type error is fixed.

It is noted that type information for hardware device nodes may be checked at other times in addition to when the hardware device class for a node is changed. For example, the programming environment may be operable to track changes to a hardware device class itself, e.g., to a type library associated with the hardware device class, and may automatically perform type checking when the class is changed.

As an example of applying the above-described method, suppose that a register access node is currently configured with an input wire specifying hardware device class information to its refnum input terminal. Suppose that the specified hardware device class has an associated property "REG1" that references a REG1 register of the hardware device corresponding to the hardware device class, and the register access node has been configured to set the "REG1" property, in order to write to the REG1 register.

If the input wire to the refnum input terminal of the register access node is then replaced with another wire, then the type information associated with the new wire may be checked, in order to verify that the new wire specifes hardware device class information and that the (possibly new) specified hardware device class still has a settable property called "REG1". If it is determined that this is not the case, then the programming environment may visually or otherwise indicate a type error.

Figure 12:
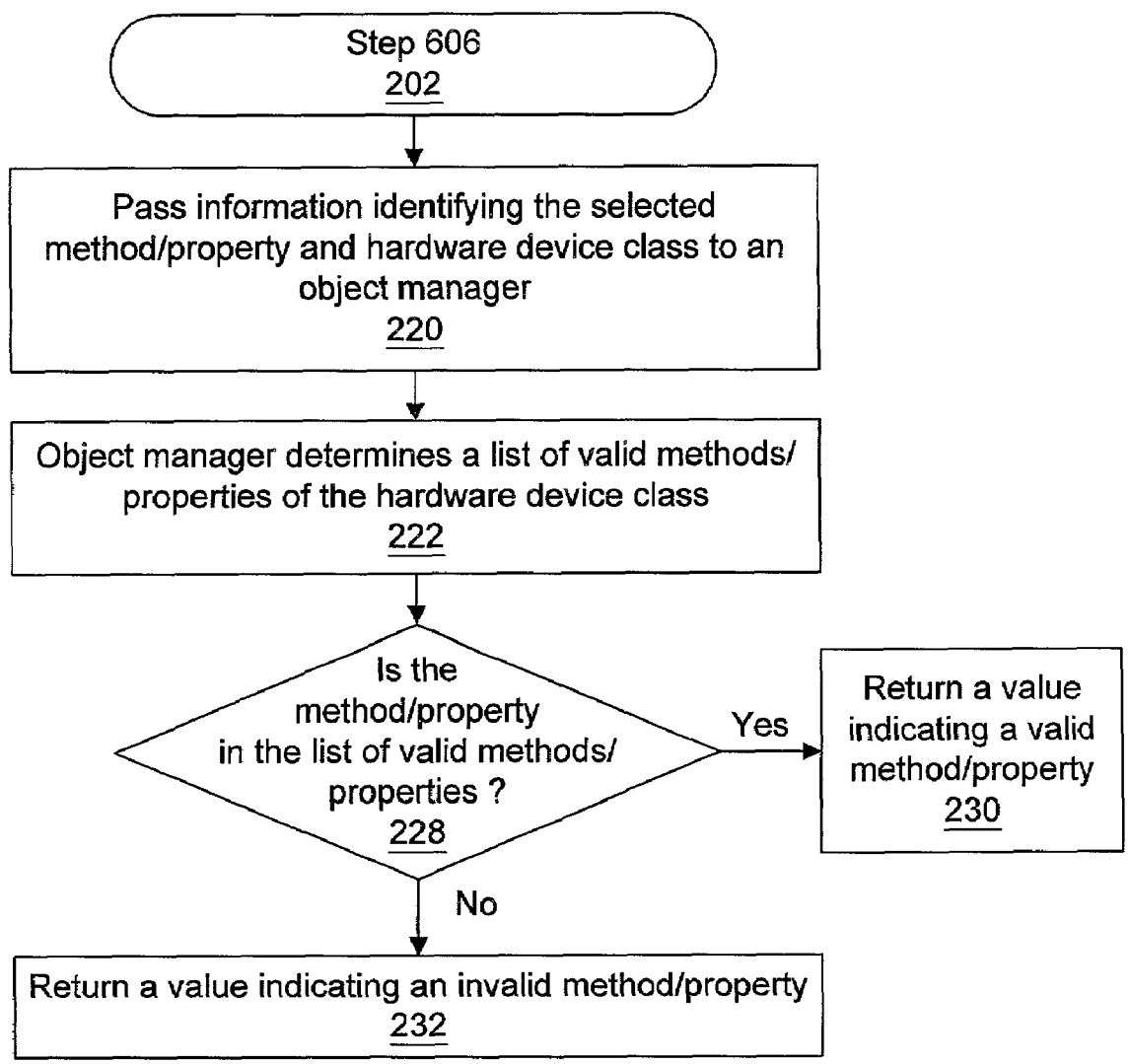
FIG. 12 is a flowchart diagram illustrating one embodiment of a method for determining whether a method/property currently selected for a hardware device node is a valid method/property for a hardware device class with which the node is associated.

FIG. 12 is a flowchart diagram illustrating one embodiment of a method for performing step 606 of FIG. 11, in which it is determined whether a method/property currently selected for a hardware device node is a valid method/property for a hardware device class with which the node is associated.

In step 220, information identifying the method/property currently selected for the hardware device node and the hardware device class with which the node is associated may be passed to an object manager. In one embodiment, information identifying a type library with which the hardware device class is associated may also be passed to the object manager.

The object manager may then return a value indicating whether or not the method/property is a valid method/property for the hardware device class, i.e., whether or not the hardware device class defines the method/property. As shown in step 222, the object manager may determine a list of all the valid methods/properties of the hardware device class. For example, as described above, in one embodiment the hardware device class is defined or described in a type library, and the object manager may query the type library to determine the valid methods/properties.

In step 228, the object manager may determine whether the currently selected method/property is included in the list of valid methods/properties. If so, then in step 230 a value indicating a valid method/property may be returned. Otherwise, in step 232, a value indicating an invalid method/property may be returned.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for creating a graphical program which performs hardware register accesses in a hardware device, wherein the method operates in a computer including a display screen and a user input device, the method comprising:

storing a description of the hardware device in the computer, wherein the description includes mnemonic names of hardware registers;

displaying on the screen a register access node in the graphical program in response to user input; and configuring the register access node to access one or more hardware registers of the hardware device, wherein said configuring includes accessing the description of the hardware device for information regarding the one or more hardware registers of the hardware device;

wherein said configuring the register access node includes:

displaying a list of the mnemonic names of hardware registers on the displace; and receiving user input selecting one or more of the mnemonic names of hardware registers for access;

wherein, during execution of the graphical program, the register access node is operable to access the one or more hardware registers of the hardware device based on the information accessed from the description of the hardware device.

2. The method of claim 1, wherein said configuring the register access node includes:

displaying a list of hardware registers; and
receiving user input to select one or more of the hardware registers from the list of hardware registers.

3. The method of claim 1,
wherein said configuring the register access node to access one or more hardware registers of the hardware device comprises configuring the register access node to access selected hardware registers described in the description of the hardware device.

4. The method of claim 1, wherein the description further includes mnemonic names of fields in the hardware registers;
wherein said configuring the register access node includes:
displaying a list of the mnemonic names of fields in the hardware registers on the display; and
receiving user input selecting one or more of the mnemonic names of fields in the hardware registers for access.

5. The method of claim 1, wherein said configuring the register access node comprises:
displaying an icon on the graphical program which references register access node configuration information; and
connecting the icon to the register access node.

6. The method of claim 5, wherein the icon is a hardware open node.

7. The method of claim 1, wherein said register access node comprises one or more input terminals, the method further comprising:
configuring the one or more input terminals to write to a hardware register of the hardware device.

8. The method of claim 1, wherein said register access node comprises one or more output terminals, the method further comprising:
configuring the one or more output terminals to read a hardware register of the hardware device.

9. The method of claim 1, further comprising:
displaying on the screen a first node in response to user input, wherein the first node references the hardware device; and
connecting the first node to the register access node, wherein said connecting provides the register access node with information regarding the hardware device.

10. The method of claim 9, wherein the first node is a hardware refnum node which references the description of the hardware device.

11. The method of claim 9, wherein said connecting the first node to the register access node includes displaying on the screen a wire connecting the first node to the register access node.

12. The method of claim 1, further comprising:
constructing execution instructions in response to the graphical program, wherein the execution instructions are executable to access hardware registers of the hardware device.

13. The method of claim 12, further comprising:
executing said execution instructions, wherein the register access node accesses hardware registers of the hardware device during said executing.

14. The method of claim 1, wherein the graphical program is operable to access hardware registers of the hardware device for performing instrumentation functions on an instrument.

15. A method for creating a graphical program which performs hardware register accesses in a hardware device, wherein the method operates in a computer including a display and a user input device, the method comprising:
storing a description of the hardware device, wherein the description includes mnemonic names of hardware registers;
displaying one the screen a first node in response to user input, wherein the first node references the description of the hardware device;
displaying on the screen a register access node in response to user input, wherein the register access node is operable to access the hardware device;
configuring the register access node in response to user input, wherein said configuring comprises:
displaying a list of the mnemonic names of hardware registers on the display; and
receiving user input selecting one or more of the mnemonic names of hardware registers for access;
connecting the first node to the register access node in response to user input, wherein the first node is operable to provide the description of the hardware device to the register access node;
wherein the register access node receives the description, wherein the register access node is operable to access hardware registers of the hardware device during execution of the graphical program based on the description of the hardware device.

16. The method of claim 15, the wherein said configuring includes accessing the description of the hardware device for information regarding the selected hardware registers.

17. The method of claim 15, further comprising: displaying selected mnemonic names of hardware registers on the display aver said receiving user input selecting one or more of the mnemonic names of hardware registers for access.

18. The method of claim 15, wherein the description further includes mnemonic names of fields in the hardware registers;
wherein said configuring the register access node includes:
displaying a list of the mnemonic names of fields in the hardware registers on the display; and
receiving user input selecting one or more of the mnemonic names of fields in the hardware registers for access.

19. The method of claim 15, further comprising:
displaying on the screen a list of descriptions of available hardware devices;
selecting the description from the list of descriptions.

20. The method of claim 15, wherein said register access node comprises one or more input terminals, wherein, for each input terminal, the method further comprises:
configuring each input terminal to write to a hardware register of the hardware device.

21. The method of claim 15, wherein said register access node comprises one or more output terminals, wherein, for each output terminal, the method further comprises:
configuring said each output terminal to read a hardware register of the hardware device.

22. The method of claim 15, wherein receiving user input further comprises:
selecting a first hardware register from said list of hardware registers;
associating a first terminal of the register access node with said first hardware register;
selecting the first terminal as a read or a write terminal;
connecting the first terminal to a node in the graphical program; and repeating the above steps for one or more hardware registers of the hardware device.

23. The method of claim 22, wherein the register access node is a growable node which may comprise a variable number of user selected terminals.

24. The method of claim 15, further comprising:
displaying a name of the hardware description on the register access node in response to connecting the first node to the register access node.

25. The method of claim 15, wherein the first node is a hardware open node.

26. The method of claim 25, further comprising:
displaying on the screen a hardware refnum node in response to user input, wherein the hardware refnum node references the description of the hardware device; and
connecting the hardware refnum node to the first node, wherein said connecting provides the first node with a reference to the description of the hardware device.

27. The method of claim 15, wherein the first node is a hardware refnum node which references the description of the hardware device.

28. The method of claim 15, wherein said connecting the first node to the register access node includes displaying on the screen a wire connecting the first node to the register access node.

29. The method of claim 15, further comprising:
constructing execution instructions in response to the graphical program, wherein the execution instructions are executable to access hardware registers of the hardware device.

30. The method of claim 29, further comprising:
executing said execution instructions, wherein the register access node accesses hardware registers of the hardware device during said executing.

31. The method of claim 15, wherein the graphical program is operable to access hardware registers of the hardware device for performing instrumentation functions on an instrument.

32. A method for creating a graphical program which performs hardware register accesses in a hardware device, wherein the method operates in a computer including a display and a user input device, the method comprising:
storing a description of the hardware device, wherein the description includes mnemonic names of hardware registers;
displaying on the screen a register access node in the graphical program in response to user input, wherein the register access node is operable to access the hardware device;
connecting an input of the register access node to receive the description of the hardware device in response to user input; and
configuring the register access node to access selected hardware registers described in the description of the hardware device in response to user input, wherein said configuring includes accessing the description of the hardware device for information regarding the selected hardware registers of the hardware device;
wherein said configuring comprises:
displaying a list of the mnemonic names of hardware registers on the
receiving user input selecting one or more of the mnemonic names of hardware registers for access;
wherein the register access node is operable to access the selected hardware registers of the hardware device during execution of the graphical program based on the information.

33. A memory medium for performing hardware register accesses in a hardware device, the memory medium comprising program instructions executable by a processor to:
display on the screen a register access node in the graphical program in response to user input; and
configure the register access node to access one or more hardware registers of the hardware device, wherein, in configuring the register access node to access the one or more hardware registers of the hardware device, the program instructions are executable by the processor to access a description of the hardware device for information regarding the one or more hardware registers of the hardware device, wherein the description includes mnemonic names of hardware registers;
wherein said configuring the register access node, the program instructions are executable to:
display a list of the mnemonic names of hardware registers on the display; and
receive user input selecting one or more of the mnemonic names of hardware registers for access;
wherein, during execution of the graphical program, the register access node is operable to access the one or more hardware registers of the hardware device based on the information accessed from the description of the hardware device.

34. The memory medium of claim 33, wherein in performing said configuring the register access node, the program instructions are executable by the processor to:
display a list of hardware registers; and
receive user input to select one or more of the hardware registers from the list of hardware registers.

35. The memory medium of claim 33, further comprising program instructions executable by the processor to:
store the description of the hardware device in the computer;
wherein the register access node uses the description of the hardware device to access hardware registers of the hardware device during execution of the graphical program.

36. The memory medium of claim 35,
wherein said configuring the register access node to access one or more hardware registers of the hardware device comprises configuring the register access node to access selected hardware registers described in the description of the hardware device.

37. The memory medium of claim 33, wherein said configuring the register access node comprises:
displaying an icon on the graphical program which references register access node configuration information; and
connecting the icon to the register access node in response to user input.

38. The memory medium of claim 33, further comprising program instructions executable by the processor to:
construct execution instructions in response to the graphical program, wherein the execution instructions are executable to access hardware registers of the hardware device.

39. A system for performing hardware register accesses in a hardware device, the system comprising:
a computer including a processor coupled to a memory; and
a hardware device coupled to the computer;

wherein the processor is operable to execute program instructions stored in the memory to:
response to user input; and
display on the screen a register access node in a graphical program, in
configure the register access node to access one or more hardware registers of the hardware device, wherein, in configuring the register access node to access the one or more hardware registers of the hardware device, the processor is operable to execute the program instructions to access a description of the hardware device for information regarding the one or more hardware registers of the hardware device wherein the description includes mnemonic names of hardware registers;
wherein, in said configuring the register access node, the processor is operable to:
display a list of the mnemonic names of hardware registers on the dig play; and
receive user input selecting one or more of the mnemonic names of hardware registers for access;
wherein, during execution of the graphical program, the register access node is operable to access the one or more hardware registers of the hardware device based on the information accessed from the description of the hardware device.

40. The system of claim 39, wherein in performing said configuring the register access node, the processor is operable to execute program instructions to:
display a list of hardware registers; and
receive user input to select one or more of the hardware registers from the list of hardware registers.

41. The system of claim 39, wherein the processor is further operable to execute program instructions stored in the memory to:
store the description of the hardware device;
wherein the register access node uses the description of the hardware device to access hardware registers of the hardware device during execution of the graphical program.

42. The system of claim 41,
wherein said configuring the register access node to access one or more hardware registers of the hardware device comprises configuring the register access node to access selected hardware registers described in the description of the hardware device.

43. The system of claim 39, wherein the processor is further operable to execute program instructions stored in the memory to:
construct execution instructions in response to the graphical program, wherein the execution instructions are executable to access hardware registers of the hardware device.

44. A method for creating a graphical program which performs hardware register accesses in a hardware device, wherein the method operates in a computer including a display screen and a user input device, the method comprising:
storing a description of the hardware device in the computer, wherein the description includes mnemonic names of hardware registers:
displaying on the screen a register access node in the graphical program in response to user input; and
configuring the register access node to access one or more hardware registers of the hardware device;
wherein said configuring the register access node includes:
displaying a list of the mnemonic names of hardware registers on the display; and
receiving user input selecting one or more of the mnemonic names of hardware registers for access:
wherein, during execution of the graphical program, the register access node is operable to access the one or more hardware registers of the hardware device.

* * * * *

UNITED STATES PATENT AND TRADEMARK OFFICE
CERTIFICATE OF CORRECTION

| | |
|---|---|
| PATENT NO. | : 7,213,207 B2 |
| APPLICATION NO. | : 09/742523 |
| DATED | : May 1, 2007 |
| INVENTOR(S) | : Rogers et al. |

Page 1 of 1

It is certified that error appears in the above-identified patent and that said Letters Patent is hereby corrected as shown below:

Column 22 Line 58, please delete "on the displace; and" and substitute
-- on the display; and --;

Column 24 Line 6, please delete "displaying one the screen" and substitute
-- displaying on the screen --;

Column 24 Line 27, please delete "of claim 15, the wherein said" and substitute
-- of claim 15, wherein said --;

Column 24 Line 32, please delete "display aver said receiving" and substitute
-- display after said receiving --;

Column 25 Line 62, please delete "registers on the" and substitute
-- registers on the display; and --;

Column 27 Line 3, please delete "response to user input; and" and substitute
-- respond to user input; and --;

Column 27 Line 5, please delete "program, in" and substitute
-- program, and --;

Column 27 Line 18, please delete "on the dig play; and" and substitute
-- on the display; and --.

Signed and Sealed this

Twenty-eighth Day of August, 2007

JON W. DUDAS
*Director of the United States Patent and Trademark Office*